(12) United States Patent
Mehlmauer et al.

(10) Patent No.: US 9,127,997 B2
(45) Date of Patent: Sep. 8, 2015

(54) MEASURING ELEMENT, FORCE-MEASURING SENSOR, AND MEASURING ASSEMBLY FOR MEASURING FORCES

(75) Inventors: Andreas Mehlmauer, Weiz (AT); Marcus Mitsch, Kierling (AT); Ferdinand Robier, Wagersbach (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 146 days.

(21) Appl. No.: 13/552,674

(22) Filed: Jul. 19, 2012

(65) Prior Publication Data

US 2013/0061689 A1 Mar. 14, 2013

Related U.S. Application Data

(60) Provisional application No. 61/509,185, filed on Jul. 19, 2011.

(30) Foreign Application Priority Data

Mar. 7, 2012 (EP) ..................................... 12158446

(51) Int. Cl.
*G01L 1/22* (2006.01)
*G01L 5/16* (2006.01)

(52) U.S. Cl.
CPC ............... *G01L 1/2243* (2013.01); *G01L 5/161* (2013.01)

(58) Field of Classification Search
CPC ..................................................... G01L 1/2243

USPC ...................................... 73/862.041, 862.045
See application file for complete search history.

(56) References Cited

U.S. PATENT DOCUMENTS

| | | | |
|---|---|---|---|
| 3,618,376 A * | 11/1971 | Shull et al. ................ | 73/862.045 |
| 3,696,317 A | 10/1972 | Farr | |
| 4,065,962 A * | 1/1978 | Shoberg .................... | 73/862.628 |
| 4,094,192 A | 6/1978 | Watson et al. | |
| 4,911,024 A * | 3/1990 | McMaster ................ | 73/862.045 |
| 2009/0007696 A1 | 1/2009 | Morimoto | |

FOREIGN PATENT DOCUMENTS

| | | |
|---|---|---|
| CN | 2156494 Y | 2/1994 |
| CN | 101419102 A | 4/2009 |
| DE | 3701372 A1 | 7/1988 |
| DE | 195 25 231 A1 | 1/1997 |
| WO | WO 89/04469 A1 | 5/1989 |
| WO | 03/082470 A1 | 10/2003 |

* cited by examiner

*Primary Examiner* — Harshad R Patel
(74) *Attorney, Agent, or Firm* — Jordan IP Law, LLC; Todd A. Vaughn

(57) ABSTRACT

A measuring element for measuring forces that includes a first measuring element part by which at least one force to be measured is received, a second measuring element part by which at least one force to be measured is received, the second measuring element part being spaced from the first measuring element part, and a plurality of sensors extending between the first measuring element part and the second measuring element part and configured to measure the at least one force received by the first and second measuring element parts.

14 Claims, 5 Drawing Sheets

MEASURING ELEMENT, FORCE-MEASURING SENSOR, AND MEASURING ASSEMBLY FOR MEASURING FORCES

CROSS-REFERENCE TO RELATED APPLICATIONS

The present application claims priority under 35 U.S.C. §119 European Patent Application No. EP 12158446.0 (filed on Mar. 7, 2012), which claims priority to U.S. Provisional Patent Application No. 61/509,185 (filed on Jul. 19, 2011), which are each hereby incorporated by reference in their respective entireties.

FIELD OF THE INVENTION

The invention relates to a measuring element for measuring forces, the measuring element having two mutually spaced core parts, each core part having at least one mounting surface for introduction of the forces to be measured, four identical, mutually spaced webs, which are oriented along a longitudinal axis, are arranged in a square and are connected to the two core parts at connections faces spaced in the longitudinal axis, and force-measuring sensors on each of the webs. The invention further relates to a force-measuring sensor and to a measuring assembly for measuring forces, in particular in conjunction with the measuring element.

BACKGROUND OF THE INVENTION

The measurement of forces with the aid of the deformation of measuring elements is known in principle. For example, CN 2156494 Y discloses a measuring element for this purpose, which, in one portion, includes four mutually spaced webs oriented along a longitudinal axis, force-measuring sensors being attached to the webs. These can be used to establish forces normal to the longitudinal axis. To measure forces in the longitudinal direction, the measuring element known from CN 2156494 Y has two additional webs in a further portion, the webs having force-measuring sensors. Further examples of measuring elements are known, for example, from German Patent Publication No. DE 37 01 372 A1 and U.S. Pat. No. 3,696,317 A.

A disadvantage of the measuring element disclosed in CN 2156494 Y is that it is relatively complex in terms of design and is also relatively large in terms of size/volume.

SUMMARY OF THE INVENTION

In accordance with embodiments, provided is an enhanced measuring element, an enhanced force-measuring sensor and an enhanced measuring assembly. In particular, a device having a simplified design is provided which enables three-dimensional force measurement.

In accordance with embodiments, a measuring element is provided having two mutually spaced core parts, each core part having at least one mounting surface for introduction or otherwise receipt of the forces to be measured, four identical, mutually spaced webs, which are oriented along a longitudinal axis, are arranged in a square and are connected to the two core parts at connections faces spaced in the longitudinal axis, and force-measuring sensors on each of the webs.

In accordance with embodiments, a three-measuring sensor is provided having two first strain gauges for measuring a force in a first direction, two second strain gauges for measuring a force normal to the first direction, at least one third strain gauge for measuring a force at an angle of +45° to the first direction, and at least one fourth strain gauge for measuring a force at an angle of −45° to the first direction on a common substrate.

In accordance with embodiments, the force-measuring sensor has two third strain gauges for measuring a force at an angle of +45° to the first direction, and two fourth strain gauges for measuring a force at an angle of −45° to the first direction.

In accordance with embodiments, a measuring assembly is provided having the afore-described measuring element, such that, in the four portions of a Wheatstone measuring bridge for measuring a force in the longitudinal axis of the measuring element, the following are arranged with constant sense of direction: in a first portion, the first force-measuring sensors of a first web and the first force-measuring sensors of an opposite, third web, in a second portion, the second force-measuring sensors of a second web adjacent to the first web and the second force-measuring sensors of a fourth web opposite the second web, in a third portion, the first force-measuring sensors of the second web and the first force-measuring sensors of the fourth web, and in a fourth portion, the second force-measuring sensors of the first web and the second force-measuring sensors of the third web.

In accordance with embodiments, a measuring assembly is provided having the afore-described measuring element, such that, in the four portions of a Wheatstone measuring bridge for measuring a force normal to the measuring plane of a first web, the following are arranged with constant sense of direction: in a first portion, the third force-measuring sensors of a second web adjacent to the first web, in a second portion, the fourth force-measuring sensors of the second web, in a third portion, the fourth force-measuring sensors of a fourth web opposite the second web, and in a fourth portion, the third force-measuring sensors of the fourth web.

In accordance with embodiments, three-dimensional force measurement with only little effort is thereby enabled. The measuring element necessary for this is relatively simple in design and requires only little installation space.

In accordance with embodiments, the term "force-measuring sensor" is to be understood to mean a sensor, via which force can ultimately be established. Generally, it is a strain, and not force, which is preferably measured directly.

Within the scope of such embodiments, a "force-measuring sensor" can be provided to measure a force or strain in only one direction, or can form a group of such individual sensors.

Within the scope of such embodiments, "arranged in a square" is to be understood to mean that the centres of gravity of the web cross-sections lie in the middle of the side edges of a square, the cross-sections of two adjacent webs are in each case rotated through 90° with respect to one another, and the overall cross-section of the webs is symmetrical about the main axes of the square. The "longitudinal axis of the webs" extends through the centre of gravity of the square and is oriented normal thereto. The "measuring plane" is any plane in which the force-measuring sensors attached to a web are arranged.

Further advantageous embodiments and developments of the invention will emerge from the dependent claims and from the description in conjunction with the Figures.

An advantageous variant of a measuring element is provided if the force-measuring sensors on each of the webs are identical. Symmetrical conditions with regard to the signals received by the force-measuring sensors are thus provided, thus simplifying the evaluation of the signals.

It is advantageous if each web has a measuring plane which is oriented parallel to the longitudinal axis of the webs, in particular additionally parallel to a side edge of the square. Also, if an identical and symmetrical arrangement of force-measuring sensors is provided in each measuring plane, in each case includes: two first force-measuring sensors for measuring a force in the longitudinal axis of the measuring element, two second force-measuring sensors for measuring a force normal to the longitudinal axis, at least one third force-measuring sensor for measuring a force at an angle of +45° to the longitudinal axis, and at least one fourth force-measuring sensor for measuring a force at an angle of −45° to the longitudinal axis.

It is thus possible, with the measuring element, to measure forces in all three dimensions, such that the force measurement and the evaluation of the received measuring signals are particularly accurate due to the symmetrical design. As a result of the design in accordance with embodiments, crosstalk of unloaded branches/channels is minimized, and therefore, measuring accuracy is increased. Measurement errors are also minimized both by the symmetrical design of the measuring element and by the selected arrangement of the force-measuring sensors, preferably strain gauges.

In this regard also, it is particularly advantageous if: every two third force-measuring sensors for measuring a force are arranged at an angle of +45° to the longitudinal axis, and every two fourth force-measuring sensors for measuring a force are arranged at an angle of −45° to the longitudinal axis.

It is thus possible to create a force-measuring sensor which is symmetrical or point-symmetrical about two axes. The force measurement is simplified further still by the symmetry.

It is advantageous if the force-measuring sensors are formed as strain gauges. The measuring element, the force-measuring sensor and the measuring assembly can therefore be easily implemented in practice, since reliable measuring sensors which are easily available are used.

It is also advantageous if the core parts of the measuring element are identical, in particular with mutually parallel mounting surfaces. The measuring element can thus be used in two different positions with otherwise identical operation. Errors when installing a measuring element in a component to be measured can therefore be avoided.

It is further advantageous if the webs are formed as prisms oriented parallel to the longitudinal axis. It is particularly advantageous in this regard if the prisms/webs are rectangular in cross-section. The webs can thus be easily produced. Of course, cross-sections other than the rectangular cross-section can also be selected. For example, the webs can be formed as bars having a semi-circular, trapezoid or triangular cross-section.

It is particularly additionally advantageous if the measuring element is point-symmetrical. Due to the high degree of symmetry, the force measurement and evaluation of the measuring signals can be carried out particularly easily with use of such a measuring element. It is particularly advantageous if the measuring element is formed in one piece. Largely constant material properties in the measuring element and therefore a high level of measuring accuracy can thus be ensured.

It is still further advantageous if the width of a web is smaller than the distance between its two adjacent webs. It is thus ensured that the webs can move freely. Furthermore, access for a milling tool can thus also be provided, for example if the measuring element is milled from solid material.

It is noted at this juncture that the variants disclosed with regard to the measuring element and the resultant advantages relate equally to the force-measuring sensor and to the measuring assembly, and vice versa.

The above embodiments and developments of the invention can be combined in any manner.

BRIEF DESCRIPTION OF THE DRAWINGS

Embodiments of the invention are described below with reference to the attached Figures which illustrate such embodiments by way of example. Schematically, in the drawings.

DETAILED DESCRIPTION OF THE INVENTION

Figure 1:
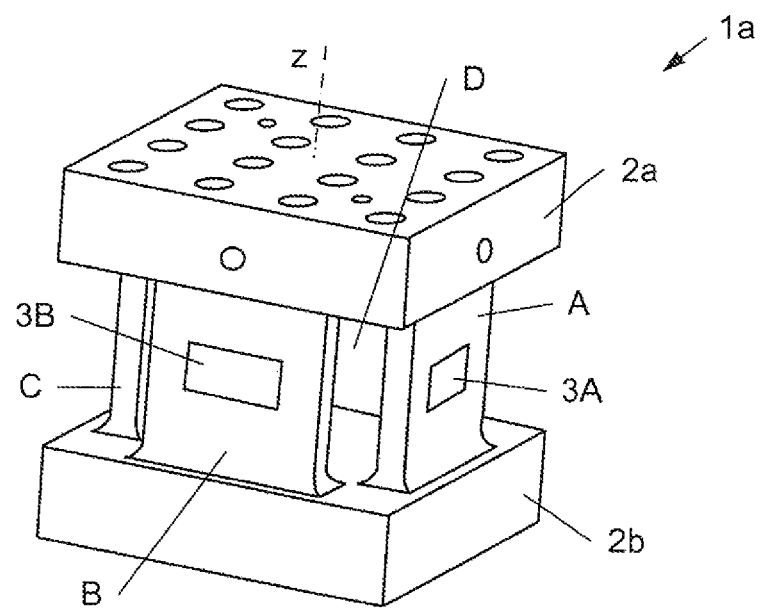
FIG. 1 illustrates a measuring element.

FIG. 1 illustrates a first example of a measuring element 1a for measuring forces, having two mutually spaced core parts 2a, 2b, each having at least one mounting surface which permit the introduction of forces to be measured. Four identical, mutually spaced webs A, B, C and D, which are oriented along a longitudinal axis z, are arranged in a square. Webs A, B, C and D extend in the space between and connect the core parts 2a, 2b at connection faces spaced in the longitudinal axis. Force-measuring sensors 3A, 3B, 3C and 3D are arranged on a corresponding web A, B, C and D. Otherwise, the measuring element 1a includes no additional force-measuring sensors.

In the example illustrated specifically in FIG. 1, the core parts 2a, 2b are substantially identical and have mutually parallel mounting surfaces, in which a plurality of mounting holes are provided. In this example, the webs A, B, C and D of the measuring element 1a are formed as prisms which are oriented parallel to the longitudinal axis z and which are rectangular in cross-section. In addition, the measuring element 1a can be formed in one piece and, for example, can be milled from solid metal. Of course, however, the measuring element 1a can also be composed of individual parts.

Figure 2:
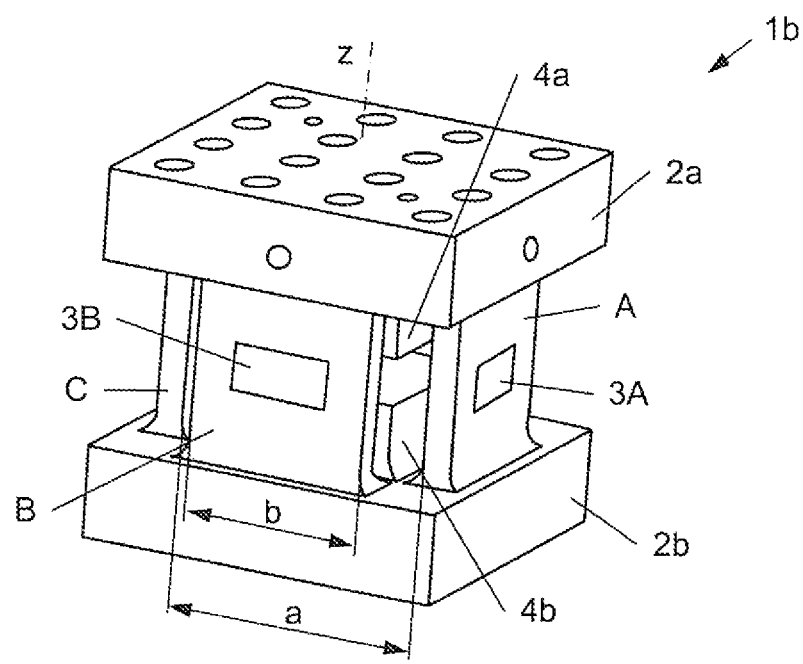
FIG. 2 illustrates a measuring element having podium-like parts in the interior.

FIG. 2 illustrates a further example of a measuring element 1b, which is very similar to the measuring element 1a. In contrast thereto however, podium-like parts 4a, 4b can be seen inside the measuring element 1b and are remnants of an interior which has not been milled out completely. These do not interfere with the measurement process however, and therefore, the machining process for production of the measuring element 1b is shortened considerably by this approach and the service life of the machining tool is increased.

It can also be seen clearly from FIG. 2 that the width b of each web A, B, C and D of the measuring element 1b is less than the distance a between two adjacent webs A, B, C and D. The same is true of the measuring element 1a. It is thus ensured that the webs A, B, C and D are configured for free movement and also that access is provided for a milling tool.

Figure 3:
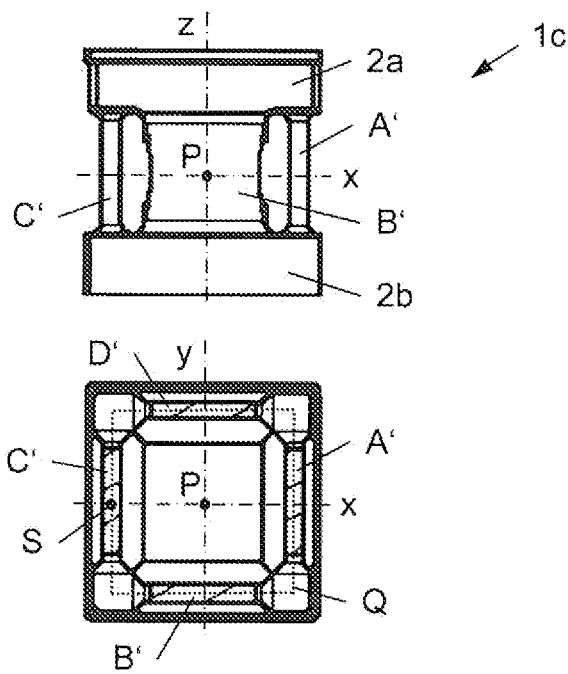
FIG. 3 illustrates a measuring element with webs which taper centrally.

FIG. 3 illustrates a third example of a measuring element 1c in plan view and front view, the measuring element 1c likewise being of similar design compared with the measuring elements 1a and 1b. In contrast thereto, however, the measuring element 1c does not have any prismatic webs, but has webs A', B', C' and D' which taper in the middle and which are likewise rectangular in cross-section in any sectional plane.

It can also be seen clearly in FIG. 3 that the webs A', B', C' and D' are arranged "in a square" configuration. This means that the centres of gravity S of the web cross-sections lie in the middle of the side edges of a square Q (illustrated by a dot in FIG. 3). In addition, the cross-sections of two adjacent webs A', B', C' and D' are rotated through 90° with respect to one another, and the overall cross-section of the webs A', B', C' and D' is symmetrical about the main axes of the square Q. The longitudinal axis z of the measuring element 1c and of the webs A', B', C' and D' extends through the centre of gravity of the square Q and is oriented normal thereto. It is noted at this juncture that the webs A, B, C and D of the measuring element 1a, 1b are also arranged "in a square" configuration. The measuring elements 1a, 1b and 1c also have a further special property. More specifically, they are point-symmetrical about a point P.

Figure 4:
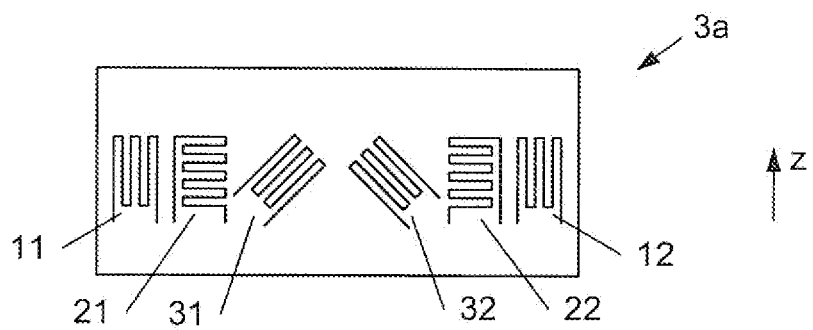
FIG. 4 illustrates a force sensor having a plurality of individual sensors.

FIG. 4 illustrates a force-measuring sensor 3a, which comprises a plurality of individual sensors 11, 12, 21, 22, 31 and 32 provided on a common substrate and which each measure a three in a predetermined direction. The force sensor 3a thus forms a group of such individual sensors 11, 12, 21, 22, 31 and 32, which in this case are formed as strain gauges. The force-measuring sensor 3a includes: a pair of first strain gauges 11, 12 for measuring a force in a first direction z, a pair of second strain gauges 21, 22 for measuring a force normal to the first direction z, a third strain gauge 31 for measuring a force at an angle of +45° to the first direction z, and a fourth strain gauge 32 for measuring a force at an angle of −45° to the first direction z.

Figure 5:
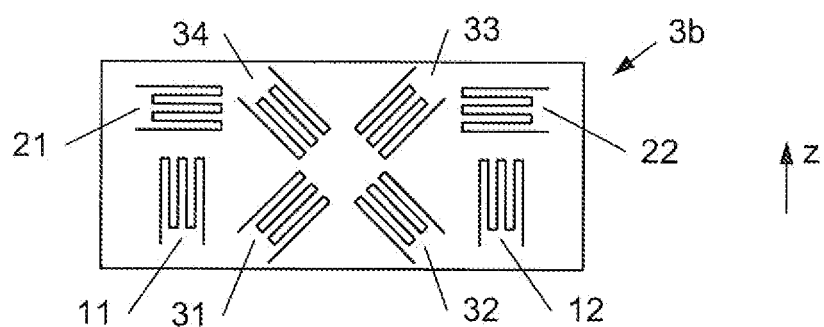
FIG. 5 illustrates a force sensor with additional, diagonally arranged force-measuring sensors.

FIG. 5 illustrates a further force-measuring sensor 3b, which is very similar to the force-measuring sensor 3b illustrated in FIG. 4. In contrast thereto, the force-measuring sensor 3b includes: a pair of third strain gauges 31, 33 for measuring a force at an angle of +45° to the first direction z, and two fourth strain gauges 32, 34 for measuring a force at an angle of −45° to the first direction z.

Figure 6:
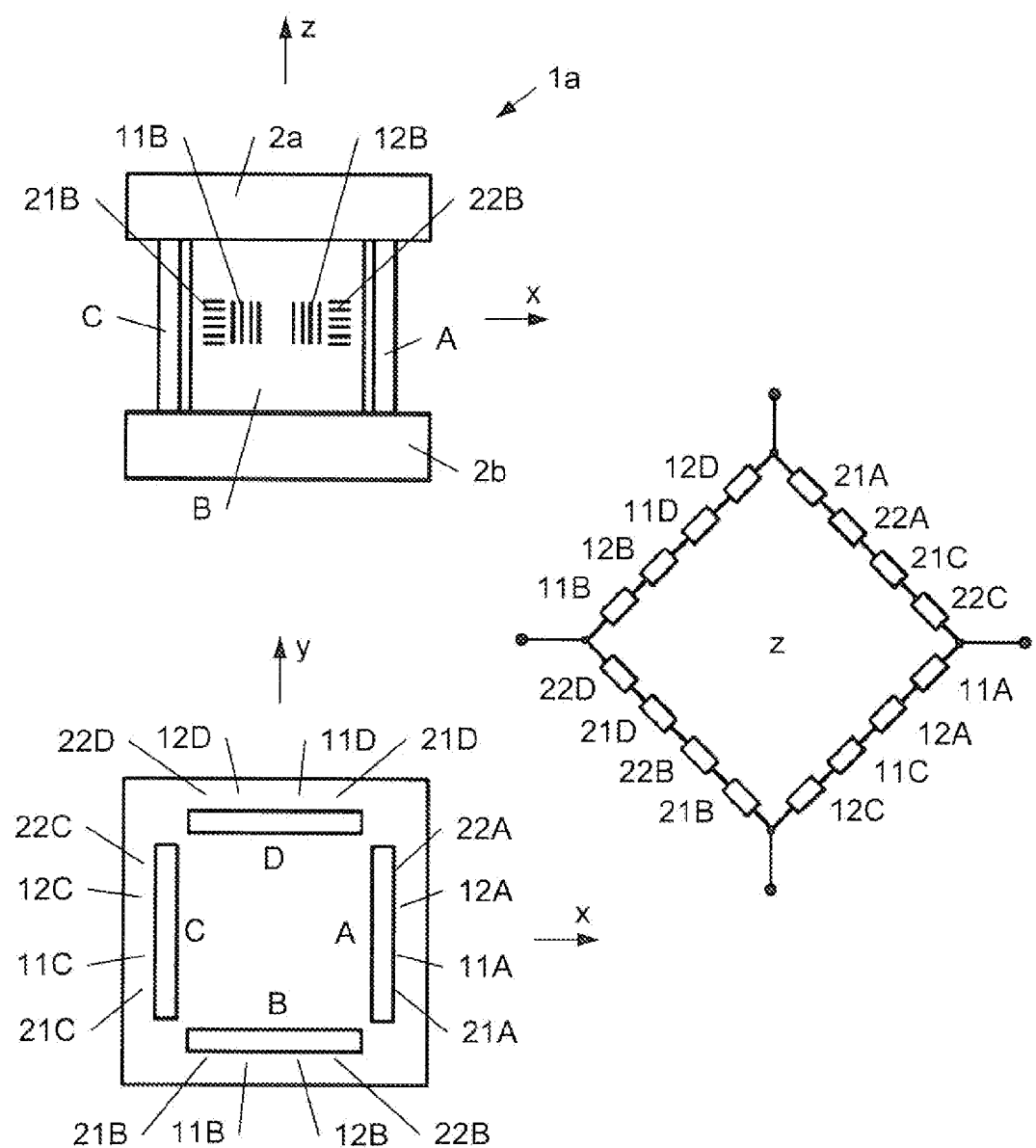
FIG. 6 illustrates a measuring assembly for measuring forces in the z-direction.
Figure 7:
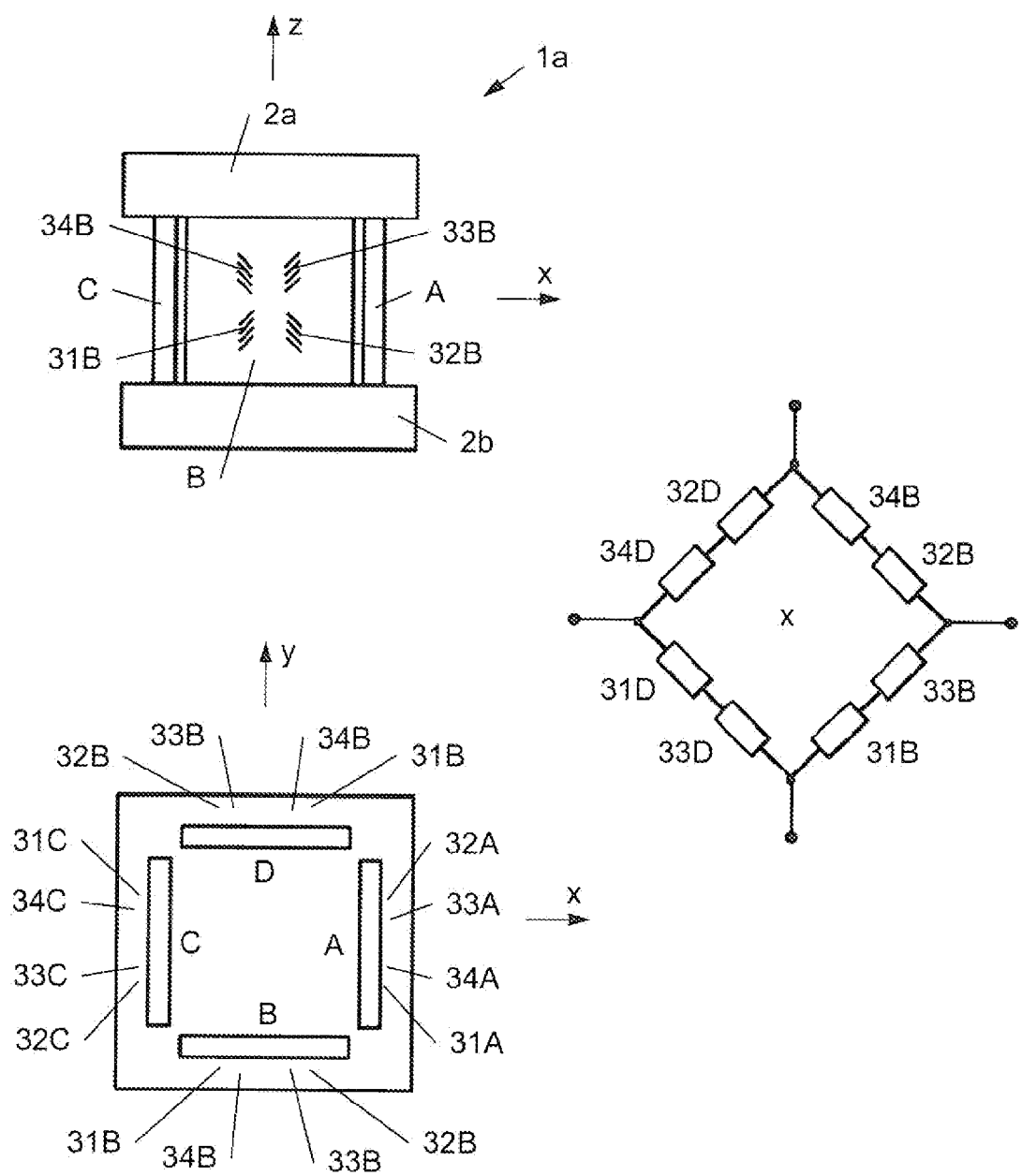
FIG. 7 illustrates a measuring assembly for measuring forces in the x-direction.
Figure 8:
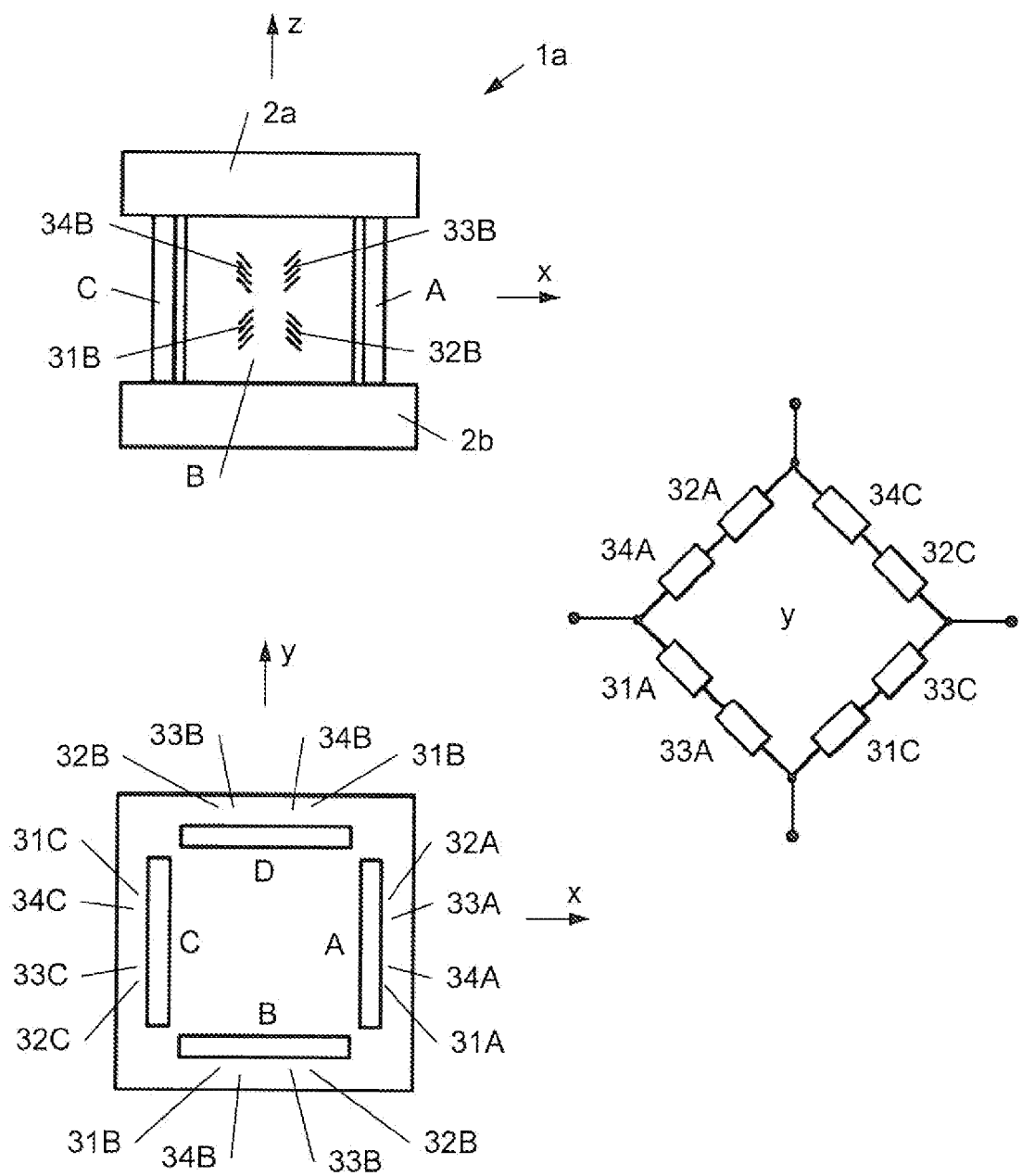
FIG. 8 illustrates a measuring assembly for measuring forces in the y-direction.

FIGS. 6 to 8 show how a measuring element 1a, 1b and 1c can be used together with a force sensor 3a, 3b.

Within the scope of the invention, a "force-measuring sensor" can be provided in just one direction to measure a force ("individual sensor") or can form a group of such sensors. In the example provided, the measuring element 1a is equipped with force sensors 3b (see FIG. 5), which each form a group of individual sensors 11, 12, 21, 22, 31, 32, 33 and 34. These are glued, for example. Of course, the measuring element 1a could also be equipped with corresponding individual sensors however.

Each web A, B, C and D of the measuring element 1a has a measuring plane, which is oriented parallel to the longitudinal axis z of the webs A, B, C and D. In the example illustrated in FIG. 6, the measuring plane of a web A, B, C and D is also oriented parallel to a side edge of the square Q (see also FIG. 3). In other words, the measuring plane of a web A, B, C and D is located on the outer surface of the web. An identical and symmetrical arrangement of force-measuring sensors 11A, 11B, 11C, 11D, 12A, 12B, 12C, 12D, 21A, 21B, 21C, 21D, 22A, 22B, 22C, 22D, 31A, 31B, 31C, 31D, 32A, 32B, 32C, 32D, 33A, 33B, 33C, 33D, 34A, 34B, 34C and 34D is then provided in each measuring plane. For example, the following are arranged on web A: a pair of first force-measuring sensors 11A, 12A for measuring a force in the longitudinal axis z; a pair of second force-measuring sensors 21A, 22A for measuring a force normal to the longitudinal axis z, a pair of third force-measuring sensors 31A, 33A for measuring a force at an angle of +45° to the longitudinal axis z, and a pair of fourth force-measuring sensors 32A, 34A for measuring a force at an angle of −45° to the longitudinal axis z. The webs B, C and D are similarly equipped with force-measuring sensors 11B, 11C, 11D, 12B, 12C, 12D, 21B, 21C, 21D, 22B, 22C, 22D, 31B, 31C, 31D, 32B, 32C, 32D, 33B, 33C, 33D, 34B, 34C and 34D.

To measure a force in the longitudinal axis z of the measuring element 1a, a measuring assembly which includes the measuring element 1a is proposed, such that, in the four portions of a Wheatstone measuring bridge for measuring this force, the following are arranged with constant sense of direction: in a first portion, the first force-measuring sensors 11A, 12A of a first web A and the first force-measuring sensors 11C, 12C of an opposite, third web C, in a second portion, the second force-measuring sensors 21B, 22B of a second web B adjacent to the first web A and the second force-measuring sensors 21D, 22D of a fourth web D opposite the second web B, in a third portion, the first force-measuring sensors 11B, 12B of the second web B and the first force-measuring sensors 11D, 12D of the fourth web D, and in a fourth portion, the second force-measuring sensors 21A, 22A of the first web A and the second force-measuring sensors 21C, 22C of the third web C.

During operation, a voltage source is connected to the measuring bridge in one diagonal and a voltmeter is connected in the other diagonal. The signal received by the measuring bridge is evaluated in a manner known per se and therefore will not be explained in greater detail.

It should be noted that only the strain gauges 11A, 11B, 11C, 11D, 12A, 12B, 12C, 12D, 21A, 21B, 21C, 21D, 22A, 22B, 22C and 22D required for measurement of a force in the longitudinal direction z are illustrated in FIG. 6. The strain gauges 31A, 31B, 31C, 31D, 32A, 32B, 32C, 32D, 33A, 33B, 33C, 33D, 34A, 34B, 34C and 34D have been omitted from FIG. 6 so as to provide an enhanced overview.

FIG. 7 illustrates how a force normal to a measuring plane of a web A, B, C and D can be measured. More specifically, a force directed towards the measuring plane of the web A or C is measured in FIG. 7, that is to say a force in the x-direction. To this end, in the four portions of a Wheatstone measuring bridge, the following are arranged with constant sense of direction: in a first portion, the third force-meauring sensors 31B, 33B of a second web B adjacent to the first web A, in a second portion, the fourth force-measuring sensors 32B, 34B of the second web B, in a third portion, the fourth force-measuring sensors 32D, 34D of a fourth web D opposite the second web B, and in a fourth portion, the third force-measuring sensors 31D, 33D of the fourth web D.

As can be seen easily from the illustrated example, the design of the measuring bridges also does not change if the webs A and C are swapped. It should be noted that only the strain gauges 31A, 31B, 31C, 31D, 32A, 32B, 32C, 32D, 33A, 33B, 33C, 33D, 34A, 34B, 34C and 34D required to measure a force normal to the longitudinal direction z are illustrated in FIG. 7. The strain gauges 11A, 11B, 11C, 11D, 12A, 12B, 12C, 12D, 21A, 21B, 21C, 21D, 22A, 22B, 22C and 22D have been omitted from FIG. 7 so as to provide an enhanced overview.

FIG. 8 illustrates how a force directed normal to the measuring plane of the web B or D can be measured, that is to say a force in the y-direction. The webs A, C and B, D in the measuring bridge already shown may swap roles. In the four portions of a Wheatstone measuring bridge, the following are therefore arranged with constant sense of direction: in a first portion, the third force-measuring sensors 31A, 33A of a first web A adjacent to the second web B, in a second portion, the fourth force-measuring sensors 32A, 34A of the first web A, in a third portion, the fourth force-measuring sensors 32C, 34C of a third web C opposite the first web A, and in a fourth portion, the third force-measuring sensors 31C, 33C of the third web C. As can be seen easily from the illustrated example, the design of the measuring bridge also does not change if the webs B and D are swapped. By superposing the force components in the x-, y- and z-direction, the resultant force can be established easily.

In FIGS. 6 to 8, the arrangement of the force-measuring sensors 11, 12, 21, 22, 31, 32, 33 and 34 as illustrated in FIG. 5 has been used. This, however, is in no way necessary. For example, an arrangement according to FIG. 4 can also be used. In the measuring bridge in accordance with FIG. 6, only the sensor 31 is to be used instead of the sensors 31 and 33, and only the sensor 32 is to be used instead of the sensors 32 and 34. A similar approach is to be adopted if a plurality of sensors is provided instead of individual sensors. For example, if the sensor 11 is formed by a plurality of individual sensors, a series connection of the individual sensors is to be inserted into the respective measuring bridges, and so on.

Lastly, it is noted that the illustrated examples are indeed advantageous embodiments of the invention, but modifications of the disclosed principle are possible. For example, the cross-sections of the webs A, B, C D, $A^6$, $B^6$, $C^6$ and $D^6$ do not necessarily have to be rectangular. For example, it would also be conceivable for the webs A, B, C D, $A^6$, $B^6$, $C^6$ and $D^6$ to have a semi-circular or triangular cross-section. The core parts 2a, 2b and the mounting surfaces thereof can also be adapted to the respective installation conditions without changing the measuring principle. They therefore do not have to be identical. Furthermore, the measuring planes are not necessarily located in the illustrated position or in the illustrated location. For example, it would also be conceivable for the measuring plane to be located on the inner face of the webs A, B, C D, $A^6$, $B^6$, $C^6$ and $D^6$ or on the side faces thereof. It is also not absolutely necessary for the illustrated measuring principle for the force-measuring sensors 3a, 3b, 3A, 3B, 3C, 3D, 11, 12, 21, 22, 31, 32, 33 and 34 to be formed as strain gauges. For example, the use of piezosensors, magnetic or optical sensors, etc. would also be conceivable. For example, the latter also include fibre Bragg gratings. It is also not necessary for the illustrated measuring principle for the measuring element 1a, 1b and 1c to be point-symmetrical about a point P, although this is advantageous for reasons of symmetry.

It is lastly stated that, where appropriate, the components of the Figures have not been illustrated to scale and that the individual variants illustrated in the Figures may also form the subject of an independent invention. Positional indications such as "right," "left," "top," "bottom" and the like refer to the illustrated position of the respective component and are to be adapted accordingly if the specified position is changed. It is also noted that the illustrated measuring elements, force-measuring sensors and measuring assemblies may, of course, have more components than illustrated, without departing from the basic idea of the present invention.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A force measuring element comprising:
   a first force measuring element part having a first mounting surface by which at least one force to be measured is received;
   a second force measuring element part spaced from the first force measuring element part, and having a second mounting surface by which the at least one force to be measured is received;
   a plurality of spaced apart webs mounted on the first mounting surface and the second mounting surface, each web having:
      a pair of symmetrically-arranged, first force-measuring sensors to measure the at least one force in a longitudinal axis of a corresponding one of the webs,
      a pair of symmetrically-arranged, second force-measuring sensors to measure the at least one force normal to the longitudinal axis of a corresponding one of the webs,
      a pair of symmetrically-arranged, third force-measuring sensors to measure the at least one force at a +45° angle relative to the longitudinal axis of a corresponding one of the webs, and
      a pair of symmetrically-arranged, fourth force-measuring sensors to measure the at least one force at a −45° angle relative to the longitudinal axis of a corresponding one of the webs,
   wherein the arrangement of the first and second force measuring element parts, and the first, second, third and fourth force-measuring sensors permit a three-dimensional force measurement and a minimization of cross-talk.

2. The force measuring element of claim 1, wherein the first, second, third and fourth force-measuring sensors each comprise strain gauges.

3. The force measuring element of claim 1, wherein each web is oriented in a longitudinal manner between the first force measuring element part and the second force measuring element part.

4. The force measuring element of claim 1, wherein the width of each web is less than a distance between adjacent webs.

5. The force measuring element of claim 1, wherein the first force measuring element part, the second force measuring element part, and the webs each comprise a metal.

6. The force measuring element of claim 1, wherein each web has a measuring plane located on an outer surface thereof.

7. The force measuring element of claim 1, wherein:
   each web has a measuring plane which is oriented parallel to the longitudinal axis thereof; and
   the measuring plane is located on an outer surface of each, respective web.

8. A force measuring element comprising:
   a first force measuring element part having a first mounting surface by which at least one force to be measured is received;
   a second force measuring element part spaced from the first force measuring element part, and having a second mounting surface by which the at least one force to be measured is received;

a plurality of spaced apart webs mounted on the first mounting surface and the second mounting surface, each web having:

symmetrically-arranged, first force-measuring sensors to measure the at least one force at a +45° angle relative to the longitudinal axis of a corresponding one of the webs, and symmetrically-arranged, second force-measuring sensors to measure the at least one force at a −45° angle relative to the longitudinal axis of a corresponding one of the webs, wherein the arrangement of the first and second force measuring element parts, and the first and second force-measuring sensors is to permit a three-dimensional force measurement and a minimization of cross-talk.

9. The force measuring element of claim 8, wherein the first and second force-measuring sensors each comprise strain gauges.

10. The force measuring element of claim 8, wherein each web is oriented in a longitudinal manner between the first force measuring element part and the second force measuring element part.

11. The force measuring element of claim 8, wherein the width of each web is less than a distance between adjacent webs.

12. The force measuring element of claim 8, wherein the first force measuring element part, the second force measuring element part, and the webs each comprise a metal.

13. The force measuring element of claim 8, wherein each web has a measuring plane located on an outer surface thereof.

14. The force measuring element of claim 8, wherein:

each web has a measuring plane which is oriented parallel to the longitudinal axis thereof; and the measuring plane is located on an outer surface of each, respective web.

\* \* \* \* \*